United States Patent
Hu et al.

(10) Patent No.: US 9,748,884 B2
(45) Date of Patent: Aug. 29, 2017

(54) MULTI-MOTOR FREQUENCY CONTROL SYSTEM AND CONTROL METHOD THEREOF

(71) Applicants: Xiaofei Hu, Shenzhen (CN); Hongxing Wang, Shenzhen (CN); Yao Wang, Shenzhen (CN)

(72) Inventors: Xiaofei Hu, Shenzhen (CN); Hongxing Wang, Shenzhen (CN); Yao Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/228,125

(22) Filed: Aug. 4, 2016

(65) Prior Publication Data

US 2017/0104433 A1  Apr. 13, 2017

(30) Foreign Application Priority Data

Oct. 8, 2015  (CN) .......................... 2015 1 0645232

(51) Int. Cl.
*H02K 33/00* (2006.01)
*H02P 25/032* (2016.01)
*H02P 27/04* (2016.01)

(52) U.S. Cl.
CPC ............ *H02P 25/032* (2016.02); *H02P 27/04* (2013.01)

(58) Field of Classification Search
CPC .. A63F 13/00; A63F 2300/302; G06F 1/1626;
G08B 13/00; G08B 21/00; G08C 19/12;
H02P 27/04; H02P 27/06; H02P 1/54;
H02P 1/00; H02P 3/00; H02P 5/00; H02P 7/00; G05B 1/02; H02K 33/00
USPC ....... 318/606, 607, 687, 34, 38, 51, 53, 103,
318/110, 114, 115, 135, 700, 400.01,
318/400.12, 779, 799, 801, 807, 432;
340/870.18, 870.26, 566, 648, 658, 683,
340/3.3, 6.13, 13.2, 13.33
See application file for complete search history.

(56) References Cited

U.S. PATENT DOCUMENTS

| 8,981,682 | B2* | 3/2015 | Delson ................... A63F 13/06 318/114 |
| 9,120,009 | B2* | 9/2015 | Bae ......................... A63F 13/00 |
| 2011/0157052 | A1* | 6/2011 | Lee ....................... G06F 1/1626 345/173 |
| 2013/0043987 | A1* | 2/2013 | Kasama ............ H04M 1/72569 340/407.1 |

\* cited by examiner

*Primary Examiner* — Antony M Paul
(74) *Attorney, Agent, or Firm* — Na Xu; IPro, PLLC

(57) ABSTRACT

The invention provides a multi-motor frequency control system and a control method thereof. The system includes an event generation module, a control module, a signal selection module, a motor module including multiple motors, a driving module for driving the motor vibration, a frequency processing module, and a frequency reading module for reading the vibration frequency of at least one motor and giving feedback to the frequency processing module. Further, a control method of the multi-motor frequency control system is also provided.

10 Claims, 2 Drawing Sheets

MULTI-MOTOR FREQUENCY CONTROL SYSTEM AND CONTROL METHOD THEREOF

FIELD OF THE INVENTION

The present disclosure is related to vibration motors, specifically related to a multi-motor frequency control system and its control method.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

The existing electronic equipment has one motor only and it is simple to alter and set the frequency. And it can be realized without complex control system. The mobile electronic equipment with multiple vibration motors cannot be realized by the simple system.

Therefore, an improved multi-motor frequency control system and its control method which can overcome the problems mentioned above are accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
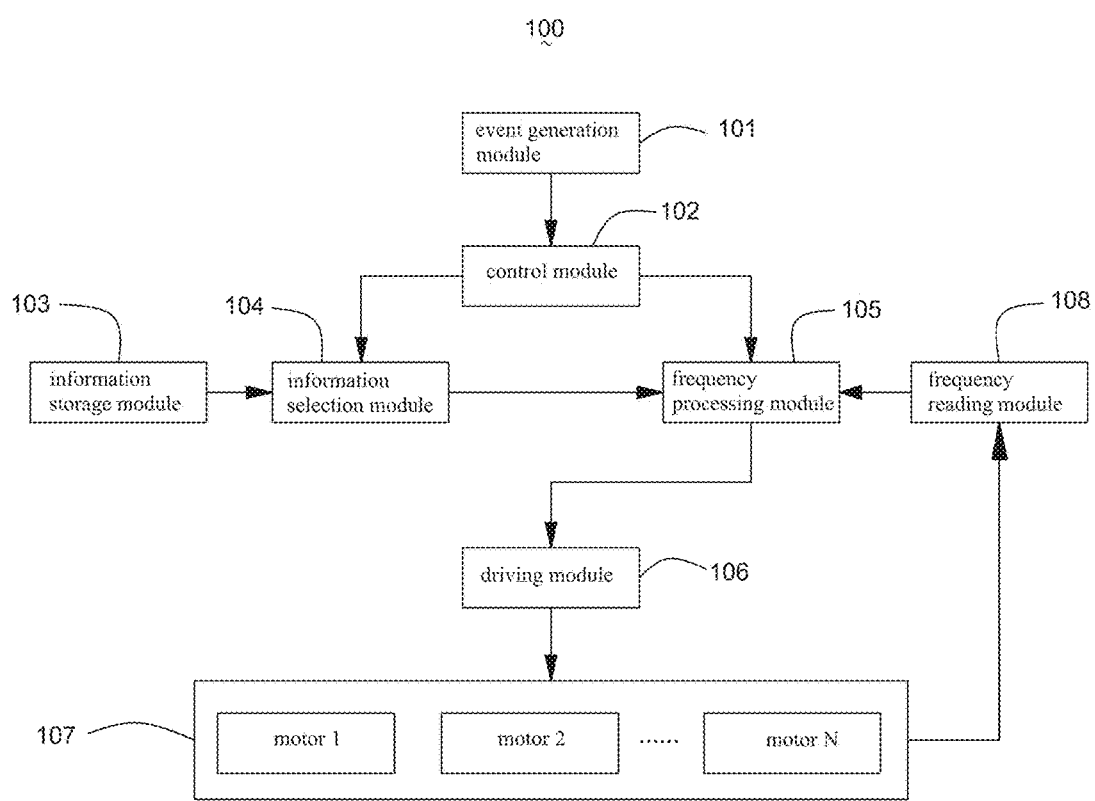
FIG. 1 is a structure diagram of a multi-motor frequency control system in accordance with an exemplary embodiment of the present disclosure.

As shown in FIG. 1, a multi-motor frequency control system 100 comprises an event generation module 101, a control module 102 electrically connected with the event generation module 101, an information storage module 103, an information selection module 104, a frequency processing module 105 electrically connected with the control module 102 and the information selection module 104, a driving module 106 electrically connected with the frequency processing module 105, a motor module 107 which comprises multiple motors and which is electrically connected with the driving module 106, and a frequency reading module 108 which is electrically connected with frequency processing module 105.

When some event or request occurs, the event generation module 101 shall send out the information corresponding to the event or request; and the information is sent to the control module 102. The information corresponding to the event comprises but not limited to the event type information and frequency information corresponding to the event. The event type refers to the type of the event to occur; for example, it can be the arrival time, calendar reminder or immediate operation event for opening some application program or some video or game or hand-off operation of the trigger event of some section in the video. The event in the invention has two meanings: one is the different event types generating two frequencies; for example, the process from the arrival time to the calendar reminder is defined as an event; and the other meaning refers to the frequency change under the same event type; for example, some scene related by the video; the vibration frequency needed in the scene is changed to f2 from f1; under the same event type (playing video), the vibration frequency is changed from f1 due to the changed scene; and it is defined as an event. The two meanings have one common point: namely, the vibration frequency is changed; the frequency change caused by the event type changed to another event type or the frequency change under the same event type shall trigger the event generation module to generate the event information to the control module 102.

The control module 102 receives the event information sent by the event generation module 102 and sends orders to the signal selection module 104; the signal selection module 104 can transfer the frequency signal needed by the event from the signal storage module 103. The frequency signal comprises but not limited to the vibration change information corresponding to the event, vibration strength corresponding to the event and lasting vibration time information. According to the different events, the vibration change information is changed from strong to weak and from weak to strong or other methods. The placing information of the equipment shows that the equipment is changed under held or placed state when some event occurs. The vibration strength information shows that the visitation needed by the event is realized by multiple motors. The vibration lasting time refers to the frequency lasting vibration time needed by one or multiple motors.

The frequency processing module 105 calculate and distribute the vibration frequency of each motors of motor module 107 according to the event information exported by control module 102 and frequency change signal exported by signal selection module.

The driving module 106 drives the motor in the motor module 107 to vibrate according to the frequency information exported by the frequency processing module 105. The motor module 107 comprises multiple motors; multiple motors can generate corresponding vibration frequency. The frequency reading module 108 can read the vibration frequency of at least one motor and feed the frequency to the frequency processing module 105. The control module 102 can send the order to the frequency processing module 105 according to the event information (such as video scene change or vibration change, etc).

The vibration frequency of the motor read by the frequency reading module 108 can be realized by the detection module electrically connected with the motor. There is one detection module to detect the vibration frequency of multiple motors; or there are multiple detection modules to detect the vibration frequency of multiple motors. Similarly, there is one driving module 106 to drive multiple motors to vibrate; or there are multiple driving modules to drive multiple motors to vibrate.

What to be noticed is that the frequency processing module 105 has different calculation methods according to the different event information sent by the control module 102. It needs one or several detection modules to read the frequency information of one or multiple motors; the vibration frequency of motors whose frequency information is not read is calculated according to the processing result of control module 102 and frequency information which has been read. At this time, the vibration frequency of other motors is changed based on the read frequency information of the motor. The frequency information of each motor can be detected; and then the value is transmitted to the frequency reading module 108; and new frequency information is obtained by the processing result of the control module 102 and the calculation method of frequency processing module 105. The calculation method of frequency processing module 105 can be average value, root-mean-square or calculation method with weighting coefficient or simple addition and subtraction or other calculation method.

The system adjust anytime the frequency information needed by the specific event through frequency reading module 108 and frequency processing module 105 on the basis of event information. It has advantages of high efficiency and timely reaction. Abundant vibration effect can be obtained by the frequency control of multiple motors.

Figure 2:
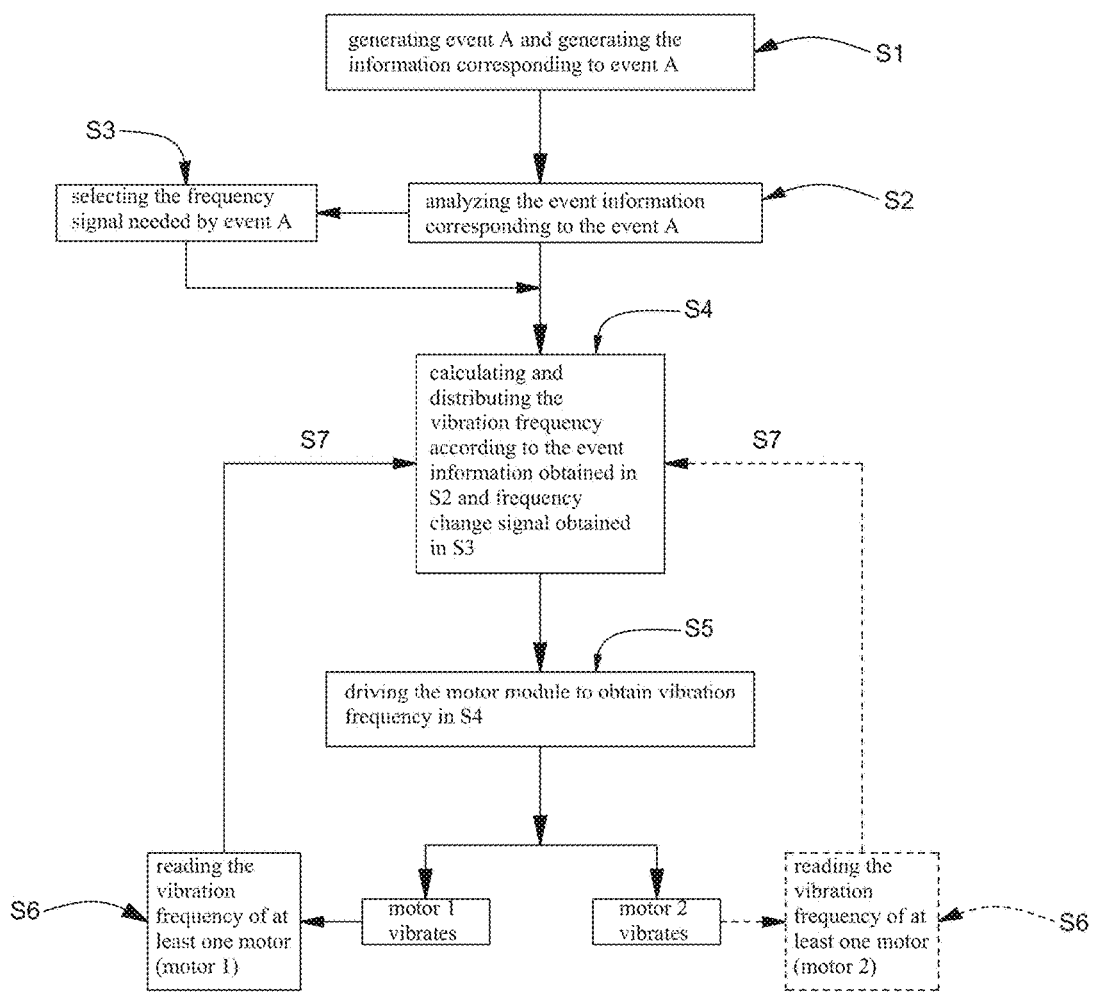
FIG. 2 is a control flow chart of the multi-motor frequency control system in FIG. 1.

As shown in FIG. 2, a control method for the multi-motor frequency control system comprises the following steps:

S1: generating event A and generating the information corresponding to event A;

S2: analyzing the event information corresponding to the event A;

S3: selecting the frequency signal needed by event A;

S4: calculating and distributing the vibration frequency according to the event information obtained in S2 and frequency change signal obtained in S3;

S5: driving the motor module to obtain vibration frequency in S4;

S6: reading the vibration frequency of at least one motor;

S7: repeating step 4.

In the embodiment, the motor frequency 102 comprises a motor 1 and a motor 2. When the motor 2 does not read the vibration frequency, namely, there is no the step in imaginary line of FIG. 2, the frequency reading module 108 reads the vibration frequency of motor 1; the vibration frequency is fed back to the control module 102; the control module 102 sends the control order to the frequency processing module 105 according to the event information; the information selection module 104 selects the frequency signal corresponding to the event; the frequency processing module 105 calculates and distributes the vibration frequency of motor 1 and motor 2 and feeds the frequency to the driving module 106 according to the output signal of the control module 102 and information selection module 104 and the specific calculation method. The vibration frequency of the motor 1 can be directly obtained by the frequency reading module 108, so the frequency processing module 105 can calculate the vibration frequency of the motor 2 and give feedback to the driving module 105 according to the vibration frequency of motor 1 and specific calculation method.

When the vibration frequency of the motor 2 is read, namely, there is the step in the imaginary line of FIG. 2, the vibration frequency of motor 1 and motor 2 are read by the frequency reading module 103; the vibration frequency of the two motors are fed back to the control module 102; the control module 102 sends out the control order to the frequency processing module 105 according to the event information. The frequency processing module 105 calculates and distributes the vibration frequency of motor 1 and motor 2 and gives feedback to the driving module 106 so as to drive the motor 1 and motor 2 to vibrate according to the control order and the output signal of the information selection module 104 in the specific calculation method.

In order to understand the technical solution of the invention well, the control method of the control system is stated by the specific examples below:

The event A occurs; and the event A is the transformation from type A to type B. The vibration effect of event type A and event type B are realized by motor 1 and motor 2. In event type A, the vibration frequency of the motor 1 is f1; the vibration frequency of motor 2 is f2; and they have the respective vibration lasting time and sequence. In the event type B, the vibration frequency of motor 1 is f1'; the vibration frequency of motor 2 is f2'; and they have the respective vibration lasting time and sequence.

When the event A occurs, namely, it is changed to event type B from event type A, the event generation module 101 can generate event information corresponding to the event A and send the information to the control module 102. The control module 102 knows that the event type B occurs. At this time, the control module 102 sends the control order to the information selection module 104; the information selection module 104 extracts the vibration strength information of motor 1 and motor 2 under event type B from the signal storage module 103 and give feedback to the frequency processing module 105 on the vibration lasting time in own vibration strength. The frequency processing module 105 can receive the control order of control module 102 and the vibration frequency information of motor 1 and motor 2 under the even type A which is read by frequency reading module 108. And what the frequency processing module 105 needs to do is to calculate the vibration frequency of motor 1 and motor 2 under the event type B according to the calculation method during the process that event type A is changed to event type B, so it gives definite driving signal to the driving module 106 to drive the motor 1 and motor 2 to vibrate.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-motor frequency control system, comprising:
an event generation module for sending out the information corresponding to the trigger event;
a control module for analyzing the corresponding information of the event;
a signal selection module for selecting the needed frequency change signal of the event;
a motor module including multiple motors;
a frequency processing module which receives the event information exported by the control module and which select specific calculation method to calculate, then distribute the vibration frequency of each motor in the motor modules according to frequency signal exported by the signal selection module;

a driving module for driving the motor module to vibrate according to the vibration frequency exported by frequency processing module;

a frequency reading module for reading the vibration frequency of at least one motor and giving feedback to the frequency processing module; wherein the frequency processing module calculates and distributes the vibration frequency to the driving module for driving the motor module to vibrate according to the vibration frequency and according to the information exported by the control module and the signal selection module.

2. The multi-motor frequency control system as described in claim 1 further comprising a signal storage module which is used for storing the frequency signal needed by the event.

3. The multi-motor frequency control system as described in claim 1, wherein the frequency reading module comprises a detection module for detecting the frequency of the motor module.

4. The multi-motor frequency control system as described in claim 3, wherein multiple detection modules are arranged to correspondingly and electrically connect with the motors.

5. The multi-motor frequency control system as described in claim 1, wherein multiple driving modules for driving multiple motors respectively are provided.

6. A control method of the multi-motor frequency control system as described in claim 1, wherein the method comprises the following steps:

S1: generating event A and generating the information corresponding to event A;

S2: analyzing the event information corresponding to the event A;

S3: selecting the frequency signal needed by event A;

S4: calculating and distributing the vibration frequency according to the event information obtained by S2 and according to frequency signal obtained in S3;

S5: driving the motor module to vibrate with vibration frequency obtained in S4;

S6: reading the vibration frequency of at least one motor;

S7: repeating step 4.

7. The control method as described in claim 6, wherein the event information comprises the event type information and frequency information corresponding to the event.

8. The control method as described in claim 6, wherein the frequency signal comprises the frequency change signal and vibration lasting time signal.

9. The control method as described in claim 6, wherein the vibration frequency of one or multiple motors is read in step S6; and in S4, new vibration frequency of the motor of the unread vibration frequency is calculated according to the vibration frequency of one or multiple motors and the specific calculation method.

10. The control method as described in claim 6, wherein in S6 the vibration frequency of all motors is read; and in S4 new vibration frequency is calculated according to the vibration read and according to the specific calculation method.

* * * * *